United States Patent
Papakipos et al.

(10) Patent No.: US 7,071,947 B1
(45) Date of Patent: Jul. 4, 2006

(54) AUTOMATIC ADJUSTMENT OF FLOATING POINT OUTPUT IMAGES

(75) Inventors: Matthew N. Papakipos, Palo Alto, CA (US); Paul D. MacDougal, Raleigh, NC (US); Wayne D. Young, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 545 days.

(21) Appl. No.: 10/627,350

(22) Filed: Jul. 24, 2003

(51) Int. Cl.
*G06K 9/40* (2006.01)
*G09G 5/00* (2006.01)
*G06T 15/60* (2006.01)

(52) U.S. Cl. .............. 345/581; 345/426; 345/586; 345/606; 382/260; 382/263

(58) Field of Classification Search ........ 345/418–428, 345/581, 586, 606, 530, 561, 690–698, 618–619; 382/260–265, 254–255, 274, 280, 300
See application file for complete search history.

(56) References Cited

U.S. PATENT DOCUMENTS

| 6,510,282 B1 * | 1/2003 | Ruck et al. ............... 396/8 |
| 6,650,327 B1 | 11/2003 | Airey et al. |
| 2004/0165086 A1 * | 8/2004 | Spitzer et al. ............ 348/239 |

* cited by examiner

*Primary Examiner*—Kee M. Tung
*Assistant Examiner*—Wesner Sajous
(74) *Attorney, Agent, or Firm*—Townsend and Townsend and Crew LLP

(57) ABSTRACT

A system adjusts floating-point-valued images prior to conversion to a display signal so that the dynamic range of the display device is effectively used. Images are adjusted using transfer functions to create an adjusted image within the dynamic range of the display device. The adjusted image also has a frequency distribution of pixel values to maximize the perception of visual detail. The system generates transfer functions from statistical attributes of one or more images. The transfer functions are applied to images on the fly as they are converted into a display signal. The statistical attributes of the image are computed on the fly as it is converted into a display signal. A first transfer function is applied to an image to produce an adjusted image in parallel with the generation of a second transfer function to be applied to a future image.

28 Claims, 9 Drawing Sheets

| 205 | 210 | 215 |
|---|---|---|
| R | G | B |

| 220 | 225 | 230 |
|---|---|---|
| S | E | M |

FIG. 2B

AUTOMATIC ADJUSTMENT OF FLOATING POINT OUTPUT IMAGES

BACKGROUND OF THE INVENTION

The present invention relates to the field of computer graphics. The human visual system can perceive images with extraordinary fidelity under a wide variety of lighting conditions. Dynamic range is the difference between the dimmest light and the brightest light that the human visual system can differentiate under a given lighting condition. For example, light values below the lower threshold of the dynamic range will all be perceived as black, while light values above the upper threshold will all be perceived as white. As lighting conditions change, the human visual system quickly adapts its dynamic range to the lighting conditions to maximize the perception of visual information.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. As the demand for computer graphics, and in particular for real-time computer graphics, has increased, specialized hardware for accelerating the rendering process has become widespread.

Typical display devices, for example computer monitors, have a very limited dynamic range as compared to the human visual system. If the rendering process generates pixel values exceeding the dynamic range of the display device, the details of the resulting image will be either too bright or too dark to be displayed correctly, similar to an overexposed or underexposed photograph.

The problems associated with the limited dynamic range of display devices are exacerbated as real-time rendering applications shift to floating-point rendering from integer rendering. In floating point rendering, each pixel is represented by one or more floating-point formatted values. Floating point formatted numbers can represent numbers over a much wider range than similarly sized integer formatted numbers. This allows applications to use more complicated rendering algorithms and to avoid the numerical rounding errors introduced by successive calculations on integer valued pixels. Because floating-point rendering greatly increases the numerical range of pixel values, the limited dynamic range of display devices becomes an even greater burden.

To compensate for the limited dynamic range of display devices, the mathematical model used by the rendering software can be modified so that the pixel values of the rendered image fall within the dynamic range of the display device. However, this approach requires application developers to extensively fine-tune the lighting in each scene, and decreases the visual quality of the rendered images. Alternatively, the rendered images can be adjusted in software to remap the dynamic range of the image to the dynamic range of the display device. However, this approach can be computationally intensive, making it unsuitable for real-time rendering applications.

It is desirable for computer graphics hardware to automatically adjust floating-point valued images to the dynamic range of the display device. It is also desirable for this adjustment to be performed with minimal computational burden on the software application, and without the need to manually fine-tune the lighting for each scene.

BRIEF SUMMARY OF THE INVENTION

An aspect of the present invention is to adjust floating-point-valued images prior to conversion to a display signal so that the dynamic range of the display device is effectively used. Floating-point valued images are adjusted using one or more transfer functions that establish a correspondence, or mapping, between floating point pixel values in an image having a first dynamic range and floating point pixel values in an adjusted image having a dynamic range within the dynamic range of the display device. A further aspect of the invention creates an adjusted image having a specified frequency distribution of pixel values to maximize the perception of visual detail. An additional aspect of the present invention generates transfer functions from statistical attributes of one or more floating point images.

In an embodiment, the mapping process is performed on the fly as a floating point image is converted into a display signal. In an additional embodiment, the statistical attributes of the floating point image are computed on the fly as a floating point image is converted into a display signal. In yet another embodiment, a first transfer function is applied to an image to produce an adjusted image in parallel with the generation of a second transfer function to be applied to a future image.

In an embodiment, a graphics processing system creates an image having floating point valued pixels in a first dynamic range and outputs image output data values having a second dynamic range. The system includes a transfer function memory adapted to store transfer function values, and a transfer function processing unit configured to create image output data values for each of the floating point valued pixels in accordance with the plurality of transfer function values. In an embodiment, the transfer function processing unit creates an image output data value based on at least two of the transfer function values. In a further embodiment, the transfer function processing unit creates an image output data value by interpolating at least two of the transfer function values.

In an additional embodiment, the system includes an image statistics unit configured to compute a statistical attribute from at least one image and a transfer function generation unit configured to generate transfer function values in response to the statistical attribute. The transfer function generation unit is further configured to store the transfer function values in the transfer function memory. In an embodiment, the image statistics unit is configured to compute a statistical attribute of a type selected from the group consisting of averages, means, medians, variances, and minimums and maximums. In an embodiment, the statistical attribute is histogram data corresponding to the relative frequencies of floating point valued pixels in the image having a value within one of a number of predetermined ranges.

In a further embodiment, the predetermined ranges are based on one or more exponent bits of a floating point valued pixel. In another embodiment, the image statistics units is configured to generate a statistical attribute from an image as the image is scanned out. In yet another embodiment, the transfer function values generated by the transfer function generation unit in response to a statistical attribute of a first image are applied to a second subsequent image. In a further embodiment, the image statistics unit is configured to compute a statistical attribute according to a user specified parameter.

BRIEF DESCRIPTION OF THE DRAWINGS

The present invention will be described with reference to the drawings, in which:

FIGS. 2A and 2B illustrate the format of floating point pixel data according to an embodiment of the invention;

DETAILED DESCRIPTION OF THE INVENTION

Figure 1:
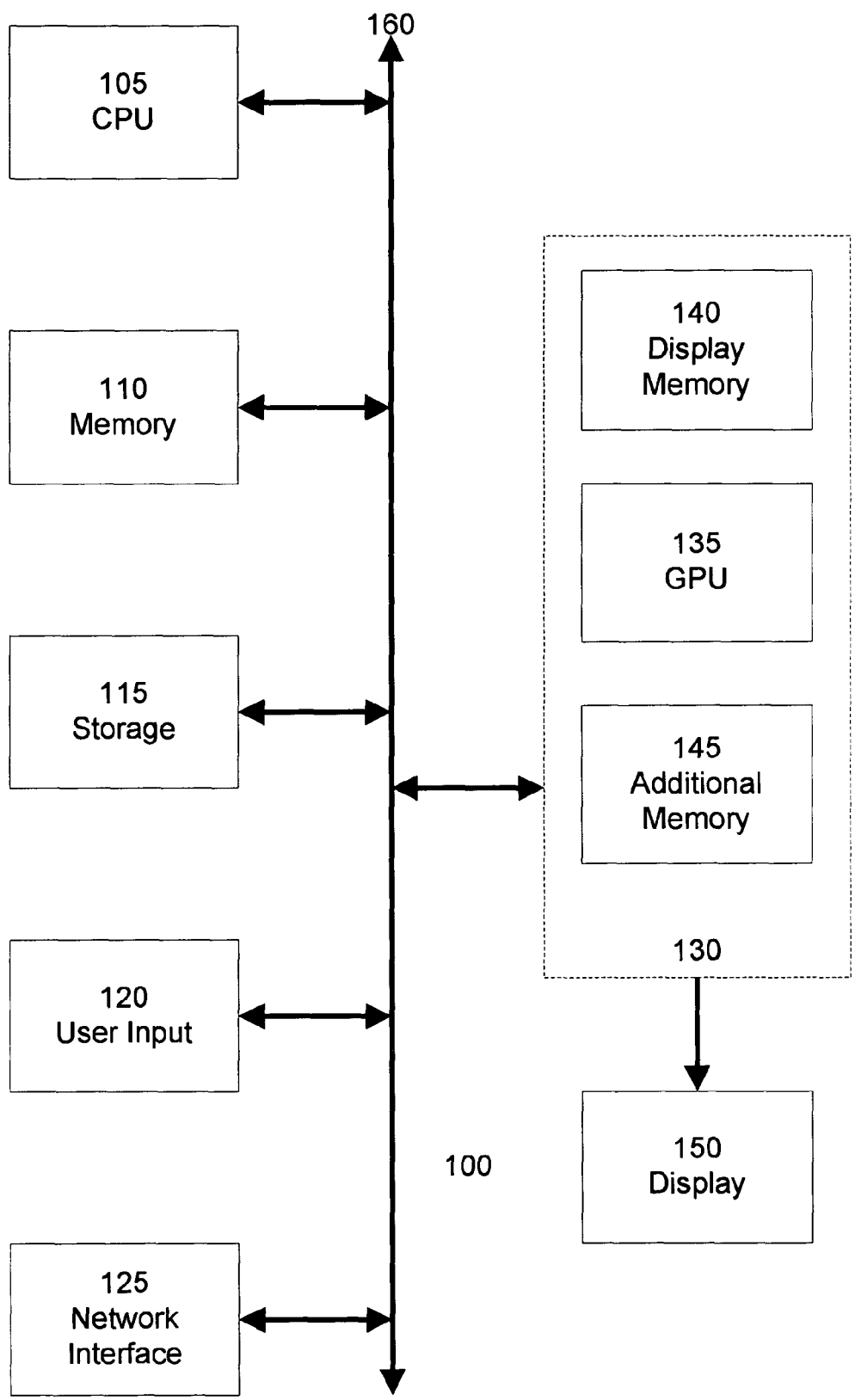
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or instructions defining the desired output images, from which the GPU 135 generates the pixel data of one or more output images. The data and/or instructions defining the desired output images is stored in additional memory 145. In an embodiment, the GPU 135 generates pixel data for output images from instructions and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

FIGS. 2A and 2B illustrate the format of floating point pixel data according to an embodiment of the invention. Each pixel of an image is associated with one or more floating point values that determine the color displayed. In FIG. 2A, an embodiment of pixel 200 includes three floating point color components 205, 210, and 215 representing the value of red, green, and blue color components of pixel 200. In an alternate embodiment, floating point color components 205, 210, and 215 represent the value of color components in other color space systems, such as the YIQ color space or the HSV color space. The YIQ color space is color space model commonly used in U.S. commercial color television broadcasting and is a recoding of red-green-blue (RGB) color space model. The HSV color space model is represents colors in terms of three constituent components: hue, saturation, and value. In a further embodiment, the number of floating point color components associated with each pixel varies according to the color space system used, for example, four color components for the CMYK color space or one color component for grey scale images. The CMYK color space represents colors in terms of the four different colors of ink typically used in full-color process printing: Cyan, Magenta, Yellow, and Black. An embodiment of pixel 200 is further associated with additional integer or floating point values representing non-color related properties of the pixel 200, such as transparency or alpha, depth values, and masking or stencil values.

FIG. 2B illustrates the format of a floating point color component 235 associated with a pixel 200. The floating point color component 235 includes a sign value 220, and exponent value 225, and a mantissa value 230. The floating point color component 235 represents a number equal to the product of the sign value 220, the mantissa value 230, and two raised to the power of the exponent value 225. In an embodiment, the floating point color component 235 is a sixteen bit binary number, in which the sign value 220 is a single bit binary number, the mantissa value 230 is a ten bit binary number, and the exponent value 225 is a five bit binary number.

Figure 3:
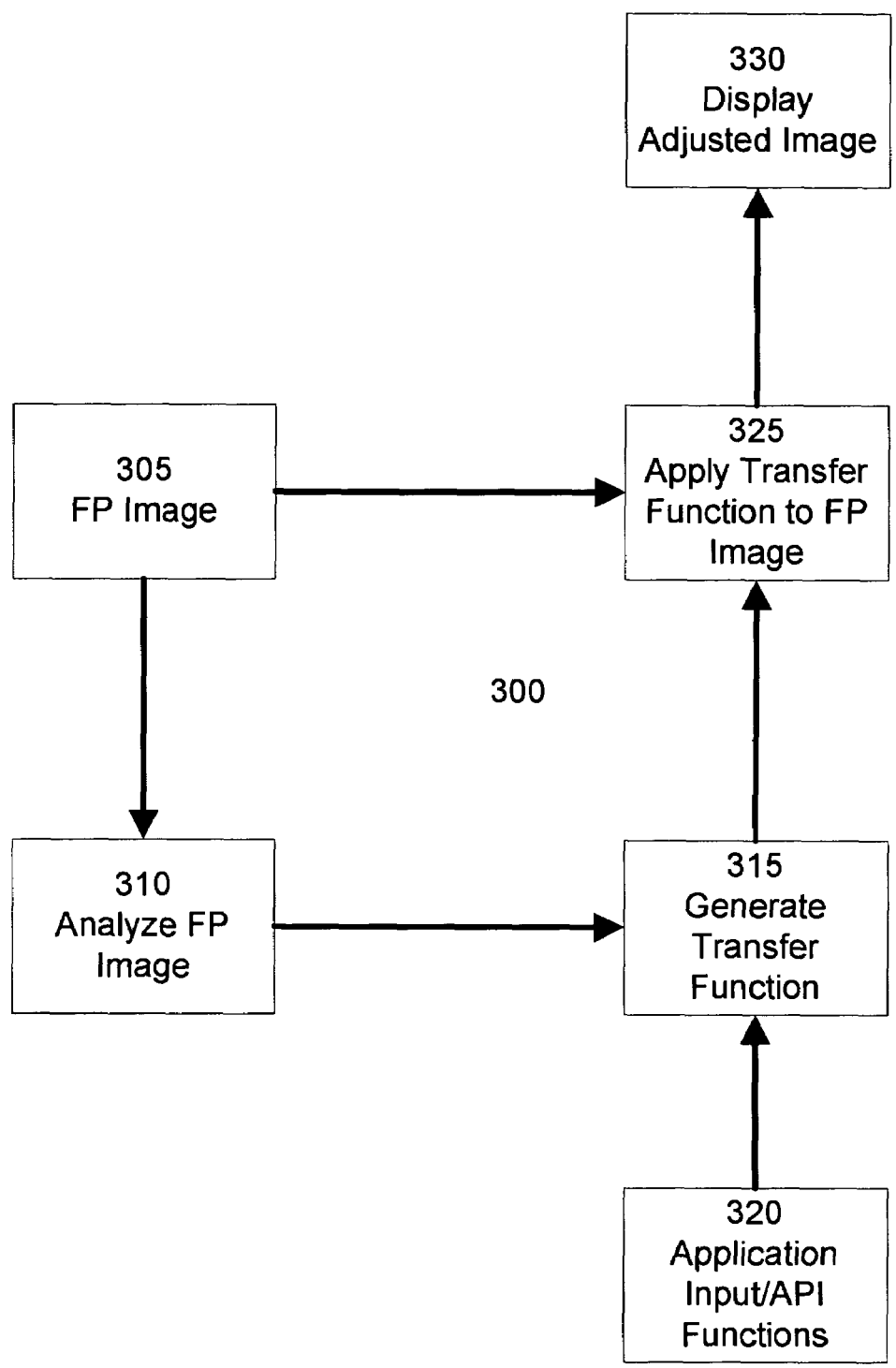
FIG. 3 illustrates a method for automatically adjusting the dynamic range of a floating point image according to an embodiment of the invention.

FIG. 3 illustrates a method 300 for automatically adjusting the dynamic range of a floating point image according to an embodiment of the invention. Method 300 reads a floating point valued image at step 305. At step 310, the method 300 analyzes the floating point color component values for the pixels of the image 305 to determine the dynamic range of the image. The dynamic range of an image may be defined by statistical properties such as minimum values, maximum values, averages, means, medians, variances, standard deviations, percentiles, histogram data, and/or other statistical information. In an embodiment, step 310 can calculate the dynamic range of the image separately for each set of color components in the image. In alternate embodiments, step 310 calculates the dynamic range of the image using the average value of the color components for each pixel, using a color space transformation of the color components to derive an intensity value for each pixel, or using the value of only one of the color components of each pixel as representative of the pixel's overall intensity value.

Step 315 generates a transfer function from the dynamic range of the image. The transfer function establishes a correspondence, or mapping, between every floating point color component value in the dynamic range of the image and a value within the dynamic range of the display device. An embodiment of step 315 generates a single transfer function for the sets of color components in the image. An alternate embodiment of step 315 generates a separate transfer function for each of the sets of color components in the image. A third alternate embodiment generates one or more transfer functions to be applied to the color components in the image following a color space transformation.

In an embodiment, the transfer function defines a linear relationship between color component values in the dynamic range of the image (the image color component values) and the corresponding color component values in the dynamic range of the display device (the adjusted color component values). A linear transfer function can be defined by specifying the parameters of a linear equation, for example, $A=S*I+B$, where A is the adjusted color component value for a pixel, I is the image color component value for a pixel, S is a scaling or contrast value and B is a bias or average brightness value. In this embodiment, step 315 calculates the values of S and B for the image, such that the resulting adjusted values are within the dynamic range of the display device.

In an alternate embodiment, step 315 generates a transfer function that defines a non-linear relationship between the image color component values and the corresponding adjusted color component values. Step 315 can specify the parameters of a non-linear mathematical function, such as a quadratic or cubic function, to define this relationship. Alternatively, step 315 can specify the correspondence between the image color component values and the adjusted color component values at one or more specific points. The correspondence between image color component values and adjusted color component values at other points can be determined through linear or non-linear interpolation.

In a further embodiment, step 320 provides application input to be used in generating the transfer function. In an embodiment, application input is provided through one or more functions in an application programming interface (API). Examples of APIs are OpenGL™ and DirectX™. OpenGL™ is a cross-platform standard API for 3D rendering and 3D hardware acceleration. Microsoft DirectX™ is a Microsoft Windows-based API for running and displaying applications using multimedia elements such as full-color graphics, video, 3-D animation, and surround sound. Application input can specify the transfer function parameters directly, or in an alternate embodiment, the application input specifies the desired statistical properties of the final adjusted image. In the latter embodiment, the application input can specify desired statistical properties for the adjusted image such as minimum values, maximum values, averages, means, medians, variances, standard deviations, percentiles, histogram data, and/or other statistical information. The application can specify any combination of desired statistical properties. In response to the desired statistical properties received in step 320 and the statistical information computed at step 310, step 315 generates a transfer function that results in an adjusted image having the desired statistical properties and is within the dynamic range of the display device.

Step 325 applies the transfer function generated in step 315 to the floating point image. If the transfer function is defined as the parameters of a linear equation, step 325 applies the linear equation to each of the image color component values in the image to create an adjusted image. If the transfer function is a non-linear mathematical function, step 325 applies the non-linear function to each of the image color component values in the image to create an adjusted image. When the transfer function is specified as the correspondence between the image color component values and the adjusted color component values at one or more specific points, step 325 computes the adjusted color component values for each pixel using the values for the specific points defined at step 315 and, if necessary, linear or non-linear interpolation.

Following the completion of step 325, step 330 displays the adjusted image on the display device. In an embodiment, the adjusted image is a floating point valued image, with each color component value within a predetermined numerical range, for example, 0.0 to 1.0. The predetermined numerical range corresponds to the dynamic range of the display device. At step 330, the pixels of the adjusted image are converted into a digital or analog display signal and communicated with the display device.

Figure 4:
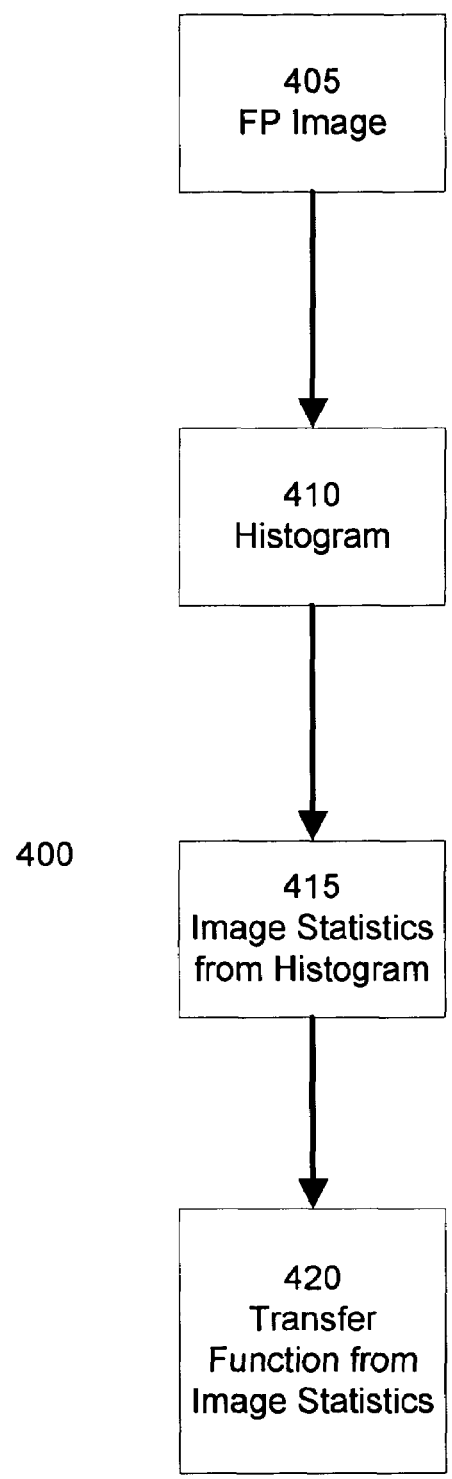
FIG. 4 illustrates a method for creating a transfer function used to automatically adjust the dynamic range of a floating point image according to an embodiment of the invention.

FIG. 4 illustrates a method 400 for creating a transfer function used to automatically adjust the dynamic range of a floating point image according to an embodiment of the invention. Step 405 reads a floating point image. Step 410 creates a histogram data structure from the pixel values of the floating point image. A histogram data structure is a data structure representing the frequency distribution of pixel values in the floating point image. A histogram data structure divides the dynamic range of the floating image into one or more bins, with each bin associated with a subset of the dynamic range. The union of all of the subsets associated with all of the bins in the histogram data structure is the dynamic range of the floating point image. Each bin stores a value proportional to the frequency of pixel values in the floating point image within the bin's associated subset of the dynamic range. In an embodiment, the value of a bin is the number of pixels in the image having a value within the bin's associated subset of the dynamic range. In an alternate embodiment, the value is the percentage of pixels in the image having a value within the bin's associated subset of the dynamic range.

Step 410 creates a histogram data structure by reading a pixel value in the floating point image and matching the pixel value to the appropriate bin. The value of the bin is then updated to include the matched pixel value in its count. The process is repeated for each pixel value in the floating point image. In an embodiment, the value of the bin is initialized to zero and then incremented by one for each pixel value matched to the bin. In an alternate embodiment, the value of the bin is scaled by the total number of pixel values in the image.

In a further embodiment, pixel values are matched to the appropriate bin using the exponent values of the pixels' floating point color components. In this embodiment, each bin is associated with a set of pixel values having one or more bits of their exponent values in common. Each pixel value is matched to the appropriate bin by comparing all or part of its exponent value to the exponent value associated with each bin. Using the exponent values of the pixel values to create the histogram data structure, as opposed to the entire floating point color component value, simplifies the matching process. The entire exponent value can be used to match pixel values, or just a portion of the exponent value. If the exponent value is a five bit binary number, all five exponent bits can be used to match pixel values to one of thirty-two ($2^5$) available bins. Alternatively, only higher order exponent bits can be used when less histogram data precision is needed. For example, the upper three bits of a five bit exponent value can be used to match pixel values to one of 8 ($2^3$) available bins.

Following the computation of the histogram data structure at step 410, step 415 generates image statistics from the histogram data. Examples of image statistics include minimum values, maximum values, averages, means, medians, variances, standard deviations, percentiles, histogram data, and/or other statistical information. At step 420, the transfer function is computed by comparing the image statistics with the dynamic range of the display device and optionally the desired statistical properties of the final adjusted image. In an embodiment, the desired statistical properties for the adjusted image are specified by the application through an API. Step 420 outputs a transfer function for adjusting a floating point image to have the desired statistical properties and fall within the dynamic range of the display device.

Figure 5:
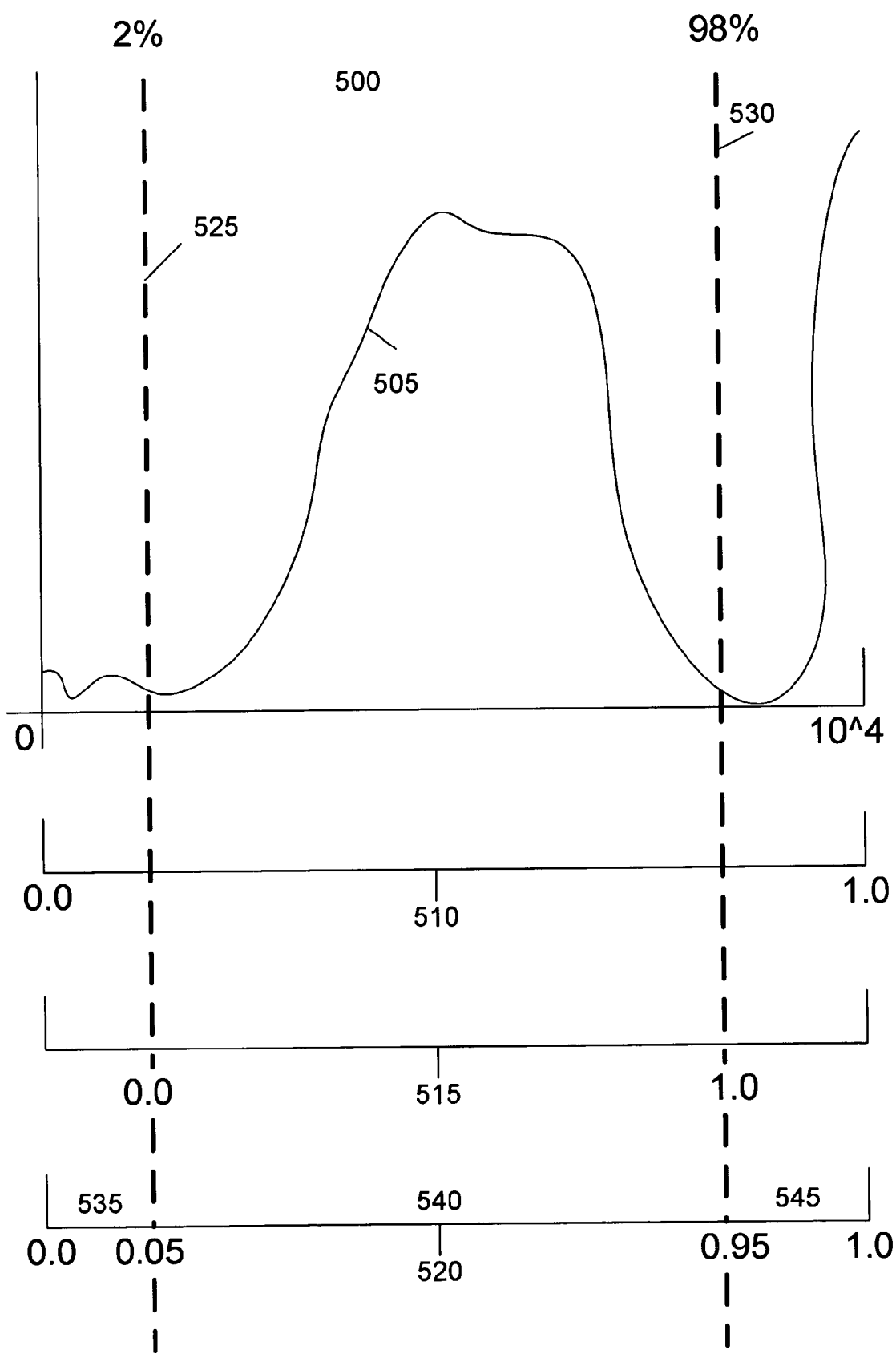
FIG. 5 illustrates the application of several different transfer functions to an example floating point image according to an embodiment of the invention.

FIG. 5 illustrates the effect of several example transfer functions on an example floating point image according to an embodiment of the invention. Distribution plot 500 illustrates the frequency distribution of pixel values in an example floating point image. The vertical axis of distribution plot 500 represents the relative frequency of pixel values, and the horizontal axis represents the dynamic range of pixel values for the example floating point image. In this example, the dynamic range of the floating point image is from 0 to 10,000. Distribution curve 505 represents the relative frequencies of every pixel value within the dynamic range of the example floating point image.

Example transfer function 510 is a linear mapping of the pixels values in the example image to the dynamic range of the display device. In this example, the dynamic range of the display device corresponds to a predetermined numerical range of 0.0 to 1.0. Pixel values in the example image are linearly mapped to the numerical range of 0.0 to 1.0.

Example transfer function 515 is another linear mapping of the pixel values in the example image to the dynamic range of the display device. Percentile indicator 525 defines a set of pixel values comprising 2% of the total number of pixels in the example floating point image. The pixels to the left of percentile indicator 525 represent 2% of the total number of pixel values in the example image. Percentile indicator 530 defines a set of pixel values comprising 98% of the total number of pixels in the example floating point image. The pixels to the left of percentile indicator 530 represent 98% of the total number of pixel values in the example image. In example transfer function 515, pixel values between the percentile indicators 525 and 530 are linearly mapped between the numerical range of 0.0 to 1.0. Pixel values outside of the percentile indicators 525 and 530 are clamped to 0.0 and 1.0, respectively. The percentiles assigned to percentile indicator can vary, and in an embodiment, can be specified directly by an application. Additional percentile indicators can be used to define other sets of pixel values, allowing for more complex linear or non-linear mappings.

Example transfer function 520 is another mapping of the pixel values in the example image to the dynamic range of the display device. Percentile indicators 525 and 530 are used to define three mapping regions: 535, 540, and 545. Pixel values in region 535, representing the lowest 2% of the total pixel values in the example image, are mapped between the numerical range of 0.0 to 0.05. Pixel values in region 540, representing pixel values greater than the lowest 2% of the pixel values and less than the highest 2% of the pixel values, are mapped between the numerical range of 0.05 and 0.95. Similarly, pixel values in region 545, representing pixel values in the highest 2% of the pixel values, are mapped between the numerical range of 0.95 and 1.0. The mapping of pixel values in example transfer function 520 can be either a piecewise linear mapping within each region, or alternatively a non-linear mapping, such as a quadratic or cubic curve fitted to all of the regions.

Figure 6:
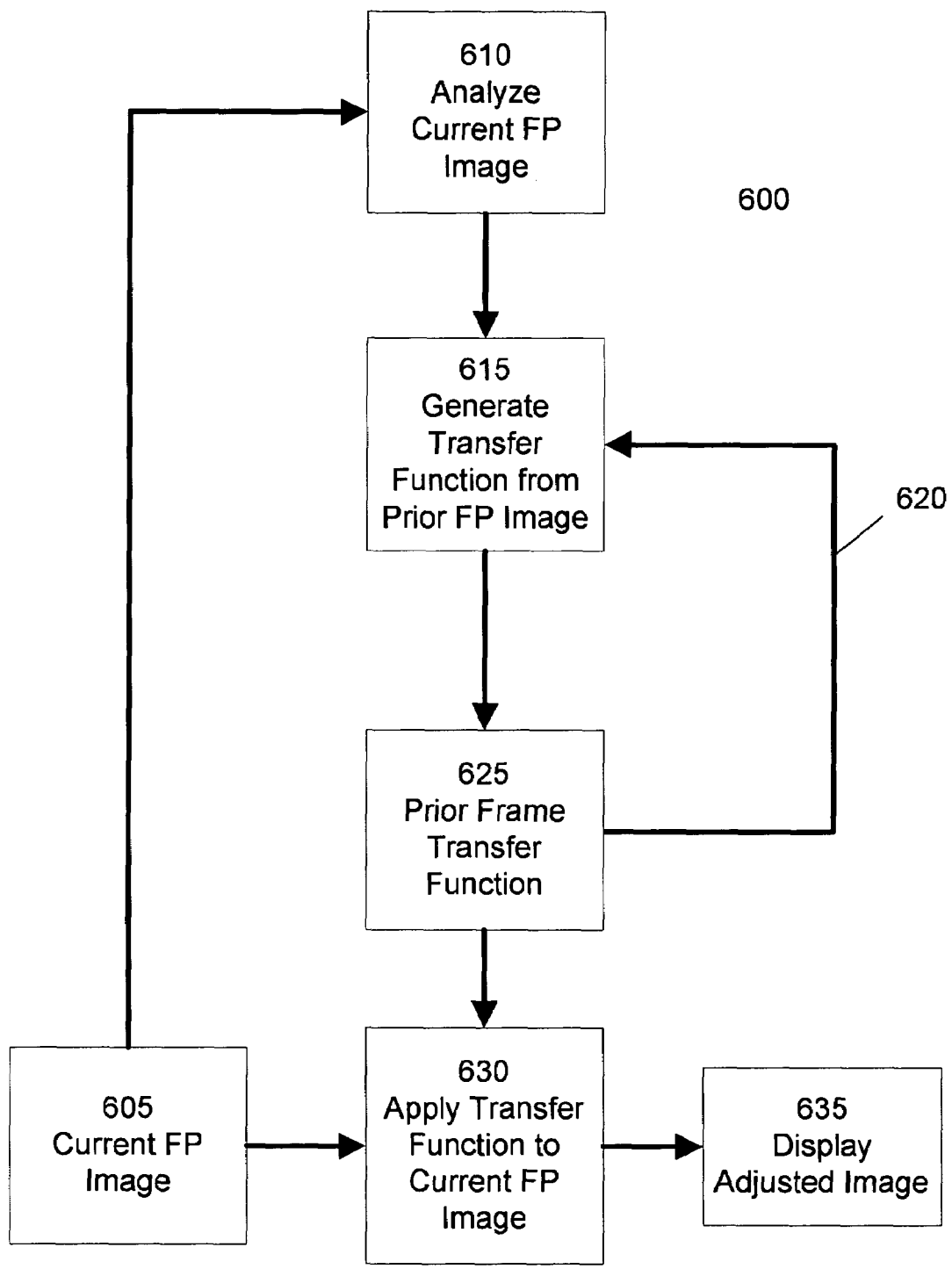
FIG. 6 illustrates a method for automatically adjusting the dynamic range of a floating point image according to another embodiment of the invention.

FIG. 6 illustrates a method 600 for automatically adjusting the dynamic range of a floating point image according to another embodiment of the invention. This embodiment takes advantage of the visual continuity between successive frames of an animated sequence to generate a transfer function from a first floating point image in parallel with applying a second transfer function to a second floating point image. In this embodiment, successive frames are assumed to be sufficiently similar that the transfer function generated for a first frame can be applied to the next frame without substantial artifacts. A transfer function computed from a current frame will be applied to the next frame. Meanwhile, an adjusted image is computed from the current frame and the transfer function from the previous frame.

Method 600 reads a floating point valued image at step 605. At step 610, the method 600 analyzes the floating point color component values for the pixels of the image 305 to determine the dynamic range of the image. As discussed above, the dynamic range of an image may be defined by statistical properties such as minimum values, maximum values, averages, means, medians, variances, standard deviations, percentiles, histogram data, and/or other statistical information. Embodiments of method 600 calculate the dynamic range of the image separately for each set of color components, or alternatively, using the average value of the color components for each pixel, using a color space transformation of the color components to derive an intensity value for each pixel, or using the value of only one of the color components of each pixel as representative of the pixel's overall intensity value.

Step 615 generates a transfer function from the dynamic range of the image. An embodiment of step 615 generates a single transfer function for the sets of color components in the image. An alternate embodiment of step 615 generates a separate transfer function for each of the sets of color components in the image. A third alternate embodiment generates one or more transfer functions to be applied to the color components in the image following a color space transformation. As discussed above, the transfer function can define a linear or non-linear relationship between the image color component values and the corresponding adjusted color component values.

In a further embodiment, application input is used in generating the transfer function. Application input can be provided through one or more functions in an application programming interface (API), such as OpenGL™ or DirectX™. As discussed above, application input can specify the transfer function parameters directly, or in an alternate embodiment, the application input specifies the desired statistical properties of the final adjusted image. Step 615 generates a transfer function that results in an adjusted image having the desired statistical properties and is within the dynamic range of the display device.

In a further embodiment, step 615 receives input 620 of one or more transfer functions generated for previous frames. Step 615 constrains the presently generated transfer function to limit the difference between the presently generated transfer function and previously generated transfer functions. This prevents the introduction of visual artifacts from rapidly changing light sources. For example, in the rendering of a nighttime scene, the twinkling of stars should not affect the brightness of nearby trees. This feature also allows the application to simulate the human visual system's gradual adjustment to a rapid change in lighting. Step 615 can constrain the present transfer function by directly limiting its variation from a previous transfer function by a predetermined amount. Alternatively, step 615 can pass the present transfer function and one or more previous transfer functions through a low pass filter, moving average, or exponential decay function. In an embodiment, the user specifies one or more parameters of the filter or other function used to constrain the present transfer function.

Step 625 stores the transfer function generated in step 615 for use with the next frame. Simultaneously, step 625 outputs the transfer function generated from a previous frame for adjusting the present frame. If an execution of step 625 occurs during the first frame of a sequence and there is no previous transfer function available, step 630 can be skipped, displaying the first frame without adjustment, or steps 630 and 635 can be skipped, discarding the first frame.

Step 630 applies the transfer function generated in step 615 to the floating point image, as discussed above. In an embodiment, step 630 is performed in parallel with steps 610, 615, and 625. If necessary, linear or non-linear interpolation is used to compute the pixel values of the adjusted image. Because the transfer function applied to the present image was actually generated using the dynamic range of a previous image, there is a possibility that the dynamic range of the present image exceeds the dynamic range of the previous image. To avoid adjusted image pixel values falling outside of the dynamic range of the display device, step 630 can clamp pixel values to the minimum and maximum values of the dynamic range of the display device, for example 0.0 and 1.0. Following the completion of step 630, step 635 displays the adjusted image on the display device. At step 635, the pixels of the adjusted image are converted into a digital or analog display signal and communicated with the display device.

Figure 7:
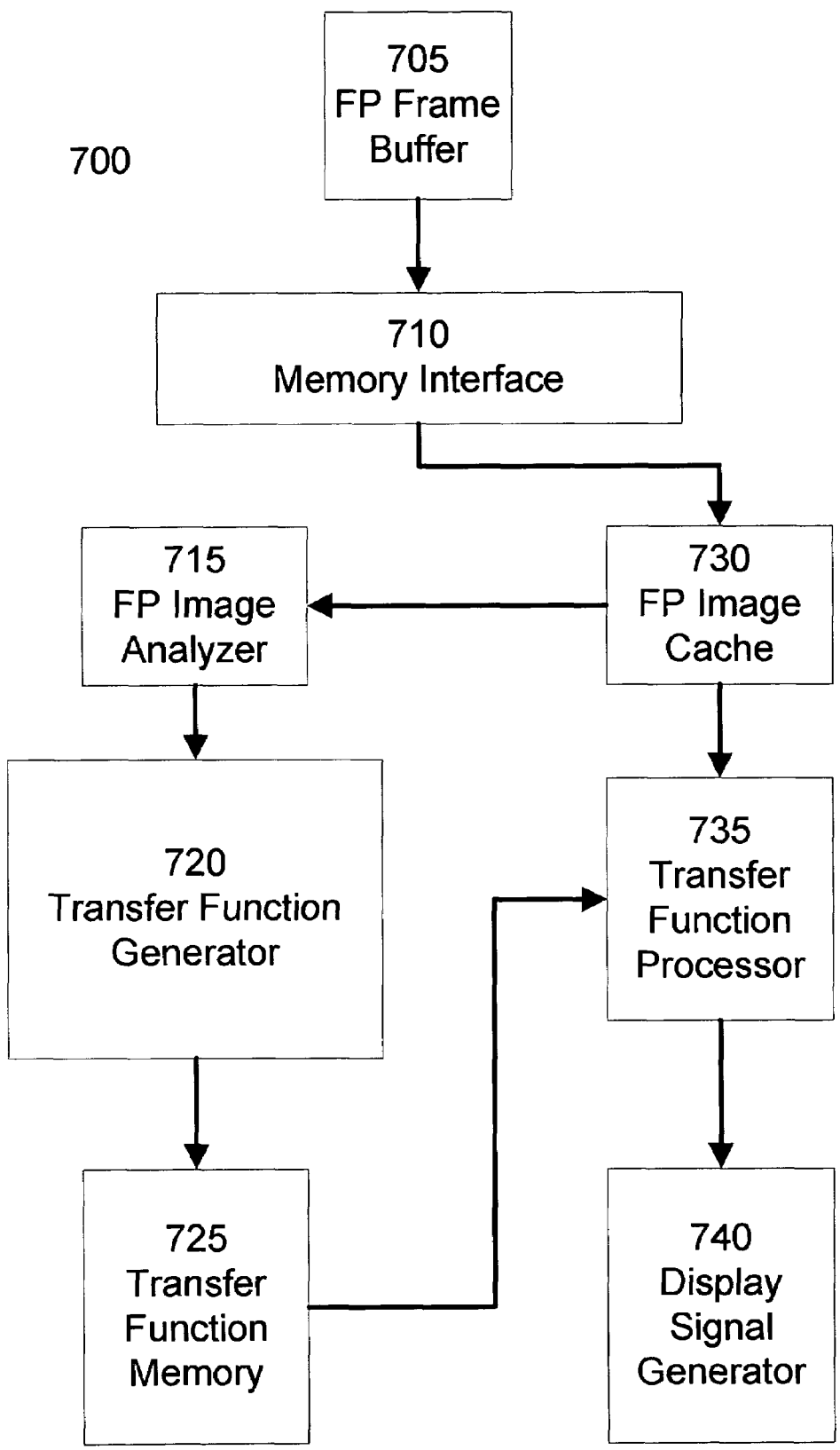
FIG. 7 illustrates a system for automatically adjusting the dynamic range of a floating point image according to yet another embodiment of the invention.

FIG. 7 illustrates a system 700 for automatically adjusting the dynamic range of a floating point image according to yet another embodiment of the invention. As discussed with respect to computer system 100, a typical graphics subsystem, such as graphics subsystem 130, periodically outputs pixel data for an image from display memory 218 and displayed on display device 150. This process, referred to as scan out, typically outputs pixel data for an image as a sequence of pixels. The sequence of pixels, referred to as the scan pattern, typically goes from left to right in each row of pixels in the image, and from top to bottom for the rows.

System 700 adjusts the dynamic range of floating point images during the scan out process. A floating point frame buffer 705 stores the unadjusted floating point image that is being scanned out. The floating point frame buffer 705 is connected with a floating point image cache 730 via memory interface 710. The scan out process is typically very sensitive to timing. The floating point image cache stores a copy of a small portion of the unadjusted floating point image to provide the scan out hardware, for example, a digital-to-analog converter, with immediate, low latency access to the portion of the floating point image being scanned out.

The floating point image cache 730 is connected with the floating point image analyzer 715. As each portion of the floating point image is copied into the floating point image cache 730, the floating point image analyzer 715 analyzes the floating point color component values for the pixels of the image portion to determine a set of dynamic range information for the image. The set of dynamic range information may be defined by statistical properties such as minimum values, maximum values, averages, means, medians, variances, standard deviations, percentiles, histogram data, and/or other statistical information. In an embodiment, the dynamic range information from each image portion can be combined by the image analyzer 715 to determine the dynamic range of the entire image.

In a further embodiment, the image analyzer 715 can determine one or more sets of local dynamic range information associated with different regions of the image instead of or in addition to the dynamic range information for the entire image (the global dynamic range information). In this embodiment, the regions of the image associated with the sets of local dynamic range information (the local regions) can be any size or shape and are not necessarily coincident with the portions of the image loaded into the floating point image cache 730. Image analyzer 715 includes hardware for defining the boundaries of the local regions and for determining dynamic range information for each local region.

The image analyzer 715 is connected with transfer function generator 720. As discussed in the method above, transfer function generator 720 generates either a single transfer function for all the color components in an image or separate transfer functions for each of the color components in the image. As discussed above, the transfer function can define a linear or non-linear relationship between the image color component values and the corresponding adjusted color component values.

A further embodiment of transfer function generator 720 uses application input, provided through one or more functions in an application programming interface (API), to generate one or more transfer functions. Additionally, the transfer function generator 720 can limit the differences between the presently generated transfer functions and previously generated transfer functions. Transfer function generator 720 constrains the present transfer functions by directly limiting its variation from a previous transfer function by a predetermined amount, or alternatively, by passing the present transfer functions and one or more previous transfer functions through a low pass filter, moving average, exponential decay function, or other limiting function. In an additional embodiment, transfer function generator 720 similarly generates transfer functions for each local region.

Transfer function generator 720 is connected with transfer function memory 725. Transfer function memory 725 stores one or more transfer functions to be applied to the floating point image as it is being scanned out. The transfer functions stored in transfer function memory 725 are read by transfer function processor 735. The transfer function processor reads pixel values from the portion of the image stored in the image cache 730. In an embodiment, the transfer function processor 735 reads pixel values from the image cache 730 in the order they are to be scanned out. Transfer function processor 735 applies one or more transfer functions to each pixel value to create the adjust output image. In an embodiment, transfer function processor 735 applies transfer functions generated from the dynamic range information of the current image. Alternatively, transfer function processor 735 applies transfer function generated from the dynamic range information of one or more previous images, as discussed above.

Transfer function processor 735 outputs the pixel values of the adjusted image to display signal generator 740. In an embodiment, transfer function processor 735 outputs pixel values directly to the display signal generator 740, such that the pixel values are converted into a display signal "on the fly". Alternatively, the pixel values of the adjusted image are temporarily stored until needed by the display signal generator 740. The display signal generator 740 creates a display signal from the pixel values of the adjusted image. The display signal may be a digital signal or an analog signal adapted to drive a display device. For example, the display signal generator 740 may include a digital to analog converter for generating a display signal for a CRT display, or a digital video signal for an LCD display.

Figure 8:
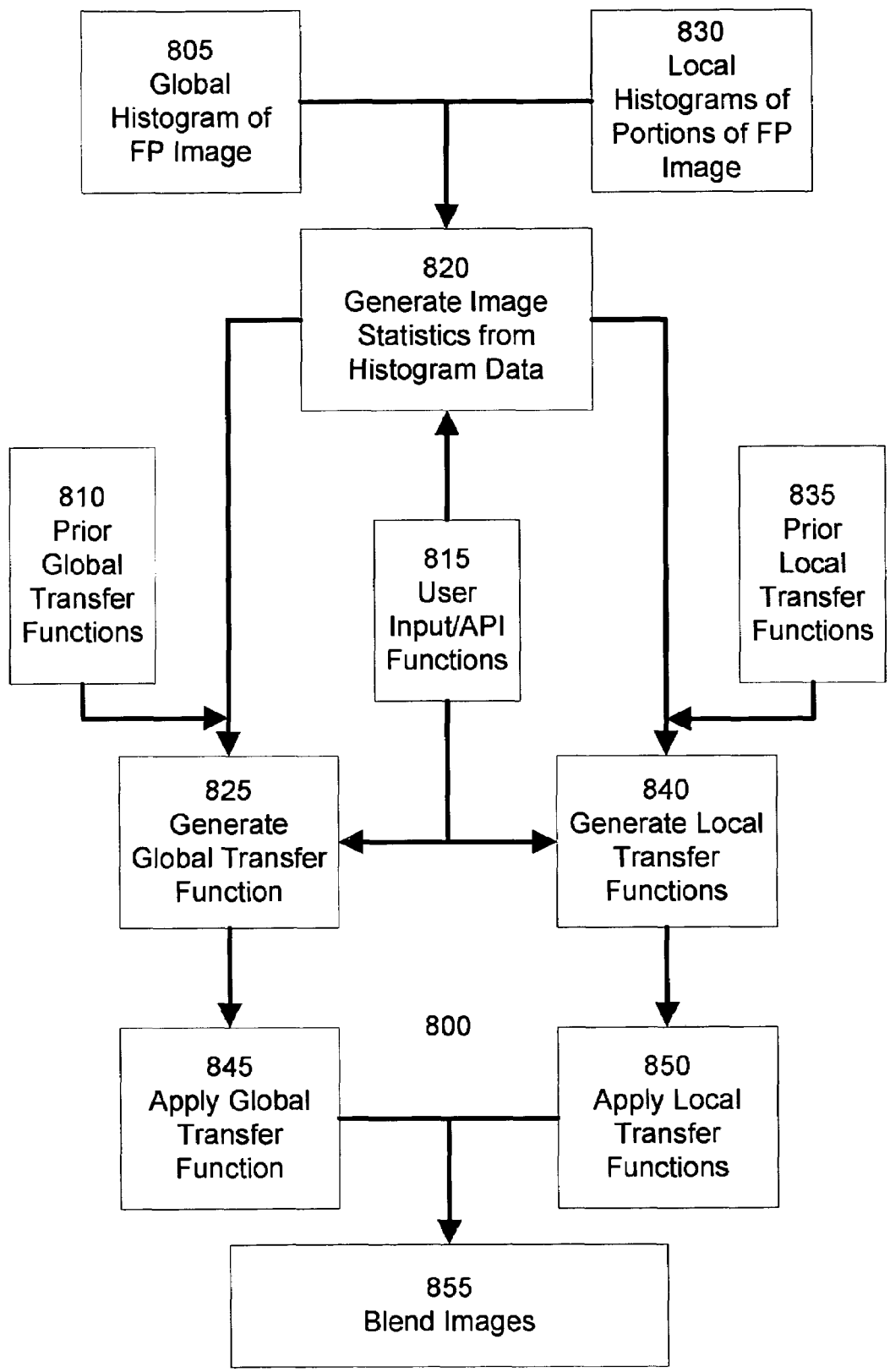
FIG. 8 illustrates a system for automatically adjusting the dynamic range of a floating point image according to a further embodiment of the invention.

FIG. 8 illustrates a system 800 for automatically adjusting the dynamic range of a floating point image according to a further embodiment of the invention. In this embodiment, system 800 uses both a global transfer function that is applied to the entire floating point image and one or more local transfer functions that are applied to different local regions of the floating point image. A global histogram data structure 805 is used by image statistics generator 820 to generate a set of global image statistics defining the dynamic range and pixel value frequency distribution of the floating point image. The image statistics generator 820 also receives application input 815 that determines the type of global image statistics to be generated.

The global image statistics, application input 815, and optionally one or more prior global transfer functions 810 are used by global transfer function generator 825 to generate a global transfer function. The global transfer function is generated in a manner similar to the embodiments previously discussed. For example, prior global transfer functions 810 may be used by global transfer function generator 825 to limit the difference between the presently generated transfer function and previously generated transfer functions, and application input 815 can specify the desired dynamic range and pixel value frequency distribution of the adjusted image. The global transfer function processor 845 applies the global transfer function to the floating point image to create an intermediate adjusted image.

Similarly, one or more local histogram data structures 830 are used by image statistics generator 820 to generate one or more sets of local image statistics defining the dynamic range and pixel value frequency distribution of one or more local regions of the floating point image. The image statistics generator 820 also receives application input 815 that determines the type of local image statistics to be generated.

The sets of local image statistics, application input 815, and optionally one or more prior local transfer functions 835 are used by local transfer function generator 840 to generate one or more local transfer functions. The local transfer functions are generated in a manner similar to the embodiments previously discussed. The local transfer functions define mappings between pixel values in one or more local regions of the floating point image and the pixel values in one or more corresponding local regions of an adjusted image. The local transfer function processor 850 applies the local transfer functions to their associated local regions in the floating point image to create a second intermediate adjusted image. In an embodiment, the local transfer function processor 850 applies two or more local transfer functions to the pixel values in areas where local regions in the floating point image overlap.

Image blending processor 855 combines the first and second intermediate adjusted images to create a final adjusted image. The intermediate images can be added together or combined using a weighted sum or average function. Because the final adjusted image should be within the dynamic range of the display the device, the global and local transfer functions can be scaled to ensure the final adjusted image has the desired dynamic range and pixel value frequency distribution. In further embodiments, the functions of system 800 can be executed in parallel and/or integrated into the scan out process, as described by the method of FIG. 6 and/or the system of FIG. 700, by applying global and local transfer functions from a prior frame to the current frame and by integrating the analysis of floating point images into the scan out hardware.

Figure 9:
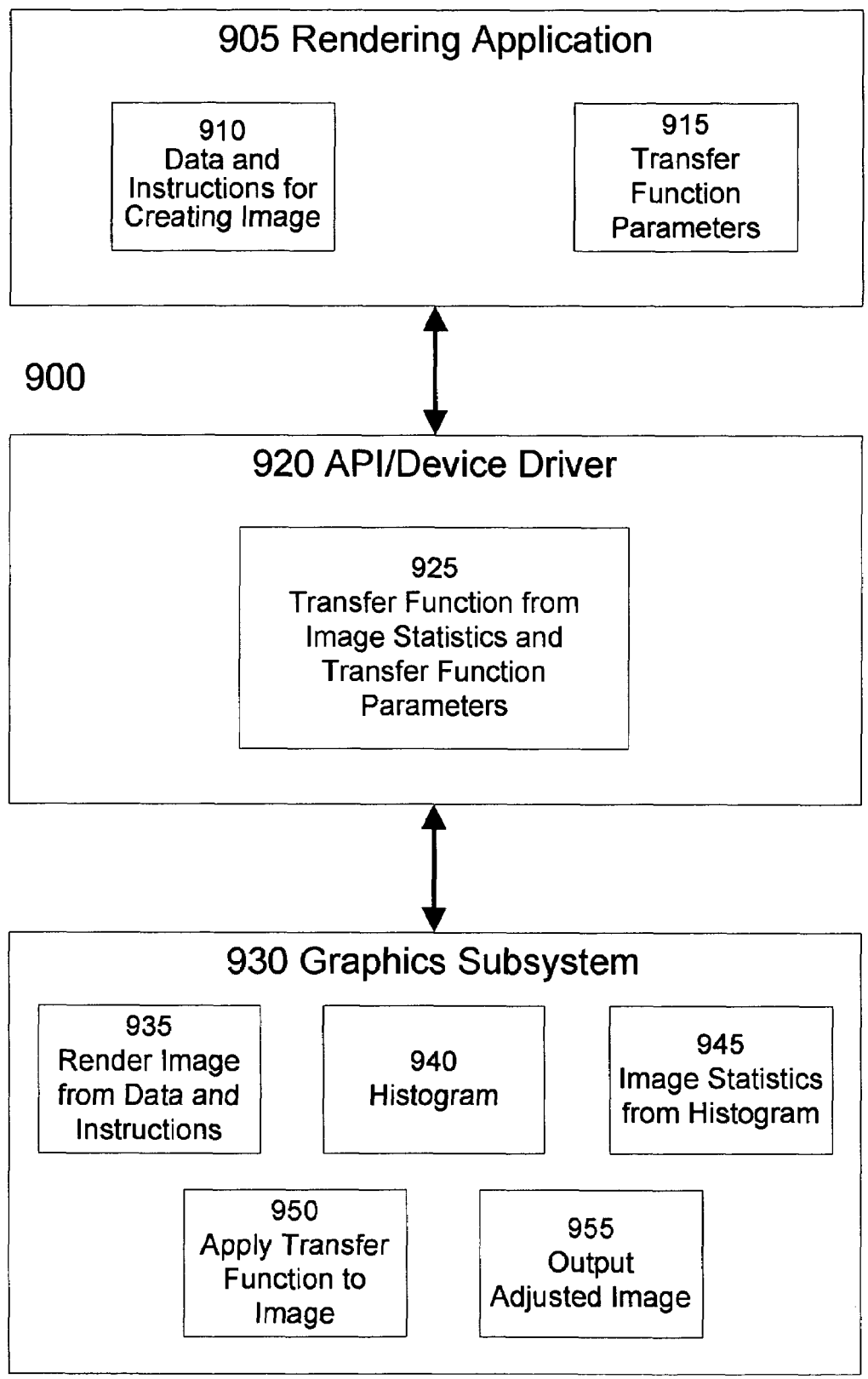
FIG. 9 illustrates the division of functions in a system for automatically adjusting the dynamic range of a floating point image according to an embodiment of the invention.

FIG. 9 illustrates the division of functions in a system 900 for automatically adjusting the dynamic range of a floating point image according to an embodiment of the invention. A rendering application 905 creates data and instructions 910 used by the graphics subsystem 930 to render a scene. The rendering application 905 also specifies transfer function parameters 915, such as a pixel value frequency distribution, used to create the adjusted image from an image rendered by the graphics subsystem 930.

The rendering application 905 communicates data and instruction 910 and transfer function parameters 915 to the API and device driver 920. The API and device driver 920 allow the rendering application 905 to communicate with the graphics subsystem 930 on a functional level, without the need for a detailed understanding of the hardware of the graphics subsystem 930. The API and device driver 930 communicate the data and instructions 910 and the transfer function parameters 915 with the graphics subsystem 930. If necessary, the API and device driver reformat this information according to the requirements of the graphics subsystem 930.

Graphics subsystem 930 renders an image 935 from the data and instructions 910 provided by the rendering application 905. To adjust the rendered image to the dynamic range of the display device and the pixel value frequency distribution specified by the rendering application 905, the graphics subsystem 930 generates a histogram data structure 940 from the rendered image. The graphics subsystem 930 also generates image statistics 945 from the histogram data structure.

In an embodiment, the image statistics 945 are communicated with the API and device driver 920. The API and device driver 920 create one or more transfer functions 925 from the transfer function parameters 915 and the image statistics 945. In this embodiment, the histogram data structure 940 is not communicated to the API and device driver 920. This conserves bandwidth on the data bus of system 900. In an alternate embodiment, the histogram data structure 940 is communicated with the API and device driver 920. In a further embodiment, the API and device driver 920 create image statistics 945 from the histogram data structure 940.

The transfer functions 925 are communicated with the graphics subsystem 930. The graphics subsystem 930 applies the transfer function to the rendered image 950 to create an adjusted image. The adjusted image is output to the display device 955. System 900 illustrates the general division of functions for adjusting the dynamic range according to an embodiment of the invention. Alternate embodiments of the invention may divide the tasks differently among the various components of a system. Additionally, the specific functions used and their sequence of operation are described in FIG. 9 generally. The division of functions described in FIG. 9 may be applied to the methods and systems described in the other embodiments of the invention.

Those skilled in the art will appreciate that the present invention establishes system and method for automatically adjusting floating point images to the dynamic range of a display device and a desired pixel value frequency distribution. The present invention has been described in relation to particular embodiments that are intended in all respects to be illustrative rather than restrictive. Therefore, it should be understood that the method and apparatus of the present invention could be practiced with modification and alteration within the spirit and scope of the claims herein. Furthermore, the invention may be implemented in any combination of hardware and/or software. Alternative embodiments will become apparent to those skilled in the art to which the present invention pertains without departing from its spirit and scope.

What is claimed is:

1. A graphics processing system for creating an image and for generating image output data values based on the image, wherein the image output data values are adapted to a display device, and wherein the image is comprised of a plurality of floating point valued pixels having a first dynamic range and the image output data values have a second dynamic range, the system comprising:
   a transfer function memory adapted to store a plurality of transfer function values, each transfer function value establishing a correspondence between a floating point valued pixel within the first dynamic range and an image output data value within the second dynamic range; and
   a transfer function processing unit configured to create an image output data value for each of the plurality of floating point valued pixels in accordance with the plurality of transfer function values.

2. The system of claim 1, wherein the transfer function processing unit creates an image output data value based on at least two of the transfer function values.

3. The system of claim 2, wherein the transfer function processing unit creates an image output data value by interpolating at least two of the transfer function values.

4. The system of claim 1, further comprising:
   an image statistics unit configured to compute a statistical attribute from at least one image; and
   a transfer function generation unit configured to generate a plurality of transfer function values in response to the statistical attribute and further configured to store the plurality of transfer function values in the transfer function memory.

5. The system of claim 4, wherein the statistical attribute is histogram data corresponding to the relative frequencies of floating point valued pixels in the image having a value within one of a plurality of predetermined ranges.

6. The system of claim 4, wherein the plurality of predetermined ranges is based on one or more exponent bits of a floating point valued pixel.

7. The system of claim 4, wherein the image statistics units is configured to generate a statistical attribute from an image as the image is scanned out.

8. The system of claim 7, wherein the transfer function values generated by the transfer function generation unit in response to a statistical attribute of a first image are applied to a second subsequent image.

9. The system of claim 4, wherein the image statistics unit is configured to compute a statistical attribute of a type selected from the group consisting of averages, means, medians, variances, and minimums and maximums.

10. The system of claim 4, wherein the image statistics unit is configured to compute a statistical attribute according to a user specified parameter.

11. A graphics processing system for creating an image and for generating image output data values based on the image, wherein the image output data values are adapted to a display device, wherein the image is comprised of a plurality of floating point valued pixels having a first dynamic range and the image output data values have a second dynamic range, the system comprising:
    an image statistics unit configured to compute a statistical attribute from at least one image;
    a transfer function generation unit configured to generate a transfer function establishing a correspondence between floating point valued pixel within the first dynamic range and an image output data value within the second dynamic range in response to the statistical attribute; and
    a transfer function processing unit configured to create an image output data value for each of the plurality of floating point valued pixels in accordance with the transfer function.

12. The system of claim 11, wherein the transfer function is a linear function of a floating point valued pixel.

13. The system of claim 11, wherein the transfer function is a non-linear function of a floating point valued pixel.

14. The system of claim 11, wherein the transfer function generation unit generates a transfer function in response to a user-specified parameter.

15. The system of claim 11, wherein the transfer function generation unit generates a transfer function adapted to maximize the perception of visual detail.

16. The system of claim 11, further comprising:
    a transfer function filtering unit configured to filter the transfer function.

17. The system of claim 16, wherein the transfer function filtering unit filters the transfer function over time.

18. The system of claim 16, wherein the transfer function filtering unit is configured to compute a moving average of a plurality of previous transfer functions.

19. The system of claim 16, wherein the transfer function filtering unit is configured to compute a low-pass filter of a plurality of previous transfer functions.

20. The system of claim 16, wherein the transfer function filtering unit is configured to apply a plurality of filters to the transfer function, each filter assigned to a portion of the transfer function corresponding to a predetermined range of pixel values.

21. A method for configuring a graphics processing system adapted to create a floating point valued image having a first dynamic range and to generate from the image a set of image output data values adapted for a display device having a second dynamic range, the method comprising:
    receiving a plurality of image output parameters defining a desired property of a set of image output data values within the second dynamic range;
    computing a statistical attribute of a floating point valued image;
    creating a transfer function establishing a correspondence between a floating point valued pixel within the first dynamic range and an image output data value within the second dynamic range in response to the statistical attribute; and applying the transfer function to the plurality of floating point valued pixels to create a set of image output data values having the desired property.

22. The method of claim 21, wherein the desired property includes the average brightness of the set of image output data values.

23. The method of claim 21, wherein the desired property includes a brightness limit of the set of image output data values.

24. The method of claim 21, wherein the desired property includes a variance of the set of image output data values.

25. The method of claim 21, wherein the desired property includes a brightness value associated with a specific distribution point of the plurality of floating point valued pixels.

26. The method of claim 21, wherein the desired property includes a contrast of the set of image output data values.

27. The method of claim 21, wherein the desired property is adapted to maximize the perception of visual detail.

28. The method of claim 21, further comprising:

receiving a filter parameter;

creating a filter based on the filter parameter; and prior to applying, filtering the transfer function in time using the filter.

* * * * *